(Model.)

G. D. PAUL.
FARE BOX.

Patented Dec. 6, 1881.

WITNESSES

INVENTOR (Model.)

G. D. PAUL.

FARE BOX.

Patented Dec. 6, 1881.

WITNESSES

INVENTOR
Geo. D. Paul
By Leggett & Leggett
ATTORNEYS (Model.)

G. D. PAUL.
FARE BOX.

Patented Dec. 6, 1881.

Fig. 3.

WITNESSES
Ed Nottingham
Herman Moran

INVENTOR
Geo. D. Paul.
By Leggett & Leggett
ATTORNEYS (Model.) G. D. PAUL. 7 Sheets—Sheet 4.
FARE BOX.

No. 250,388. Patented Dec. 6, 1881.

Fig. 4.

WITNESSES
INVENTOR

(Model.)

G. D. PAUL.
FARE BOX.

Patented Dec. 6, 1881.

WITNESSES
E. D. Nottingham
Herman Moran

INVENTOR
Geo. D. Paul
By Leggett & Leggett
ATTORNEYS (Model.) 7 Sheets—Sheet 6.

G. D. PAUL.
FARE BOX.

No. 250,388. Patented Dec. 6, 1881.

WITNESSES
E. D. Nottingham
Herman Moran

INVENTOR
Geo. D. Paul,
By Leggett & Leggett
ATTORNEYS (Model.)

G. D. PAUL.
FARE BOX.

No. 250,388. Patented Dec. 6, 1881.

Fig. 9.

WITNESSES
E. I. Nottingham
Herman Moran

INVENTOR
Geo. D. Paul
By Leggett & Leggett
ATTORNEYS

UNITED STATES PATENT OFFICE.

GEORGE D. PAUL, OF ORANGE, NEW JERSEY, ASSIGNOR TO THE PAUL SECURITY BOX COMPANY, OF NEW YORK, N. Y.

FARE-BOX.

SPECIFICATION forming part of Letters Patent No. 250,388, dated December 6, 1881.

Application filed April 21, 1881. (Model.)

*To all whom it may concern:*

Be it known that I, GEORGE D. PAUL, of Orange, in the county of Essex and State of New Jersey, have invented certain new and useful Improvements in Fare-Boxes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improvement in fare-boxes, the object of the same being to secure the safe transfer of fares or mail from the boxes to the general office; and with these ends in view my invention consists in the combination, with a fare-box having a tilting platform for temporarily stopping the fares as they are dropped into the box, of mechanism connected with said tilting platform to prevent the latter from being operated when the receiving drawer or bag has been withdrawn from the box.

My invention further consists in the combination, with a fare-box having a tilting platform, of mechanism connected with said tilting platform, to prevent the latter from being operated when the door of the box is open.

My invention further consists in certain other details in construction and combinations of parts, as will be more fully explained, and pointed out in the claims.

In the accompanying drawings.

A represents a fare-box, of any desired shape, having the upper portion, $a$, thereof composed of glass sides, to enable any one to see the nature of the articles resting on the tilting platform. This tilting platform B is made to conform to the internal shape of the enlarged end of the chute C, in which it is pivoted to the rock-shaft $b$, extending through the side of said chute, and having a crank, $c$, secured thereon, to which the link D is connected, the latter being adapted to operate the tilting platform B. The chute C can be of any desired shape and size; but I prefer to construct it, as shown, with a large upper end and inclined sides converging to a small opening at the lower end, which is located immediately over the drawer or bag. This chute is firmly fastened on the metallic plate E, the latter being situated at such a height as to allow sufficient room for the drawer or bag underneath without crowding. This plate also affords attachments on its upper surface for the mechanism employed for automatically locking the tilting platform, and is provided on its under surface with guides, in which the mouth-piece of the drawer or bag is slid and held in position. The plate E is retained in position by the lugs $e$, projecting from the bottom, having holes for the insertion of screws, which secure it inside of the frame.

The link D, above referred to, is attached at its lower end to the arm $d$ on the rock-shaft F, the latter being journaled at one end in the side of the chute C, and at the opposite end in a bearing formed on the upper side of the plate E, the outer end of said rock-shaft passing through the side of the box and connected to the operating-lever G; or, instead of making the operating-lever in a separate piece, it may equally as well be a continuation of the shaft, bent at right angles thereto, as shown in the drawings. The operating-lever G works in a guideway formed on the side of the box, which limits the movement thereof and holds the tilting platform B in a horizontal position, the weight of the said operating-lever being sufficient to bring the tilting platform horizontal, where it is held by the lower side of the operating-lever resting on the guide $e'$.

Figure 1:
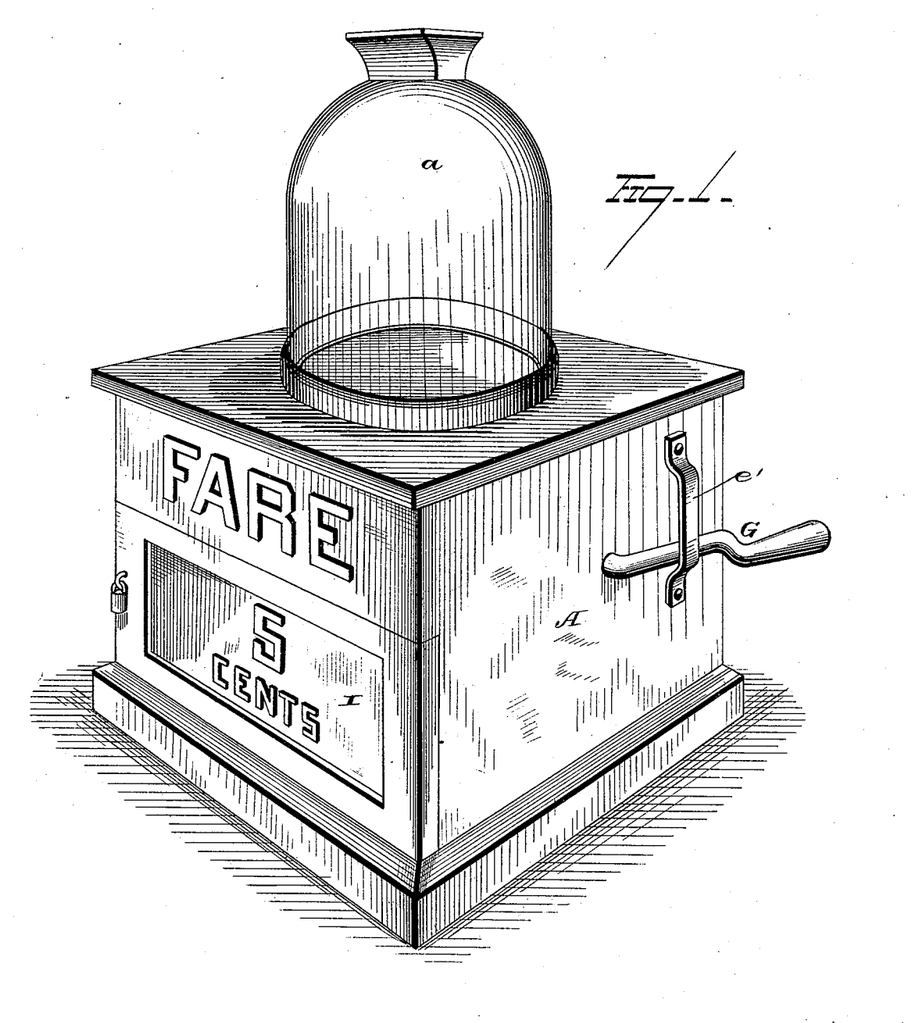
Figure 1 is a view of the exterior of the box.
Figure 2:
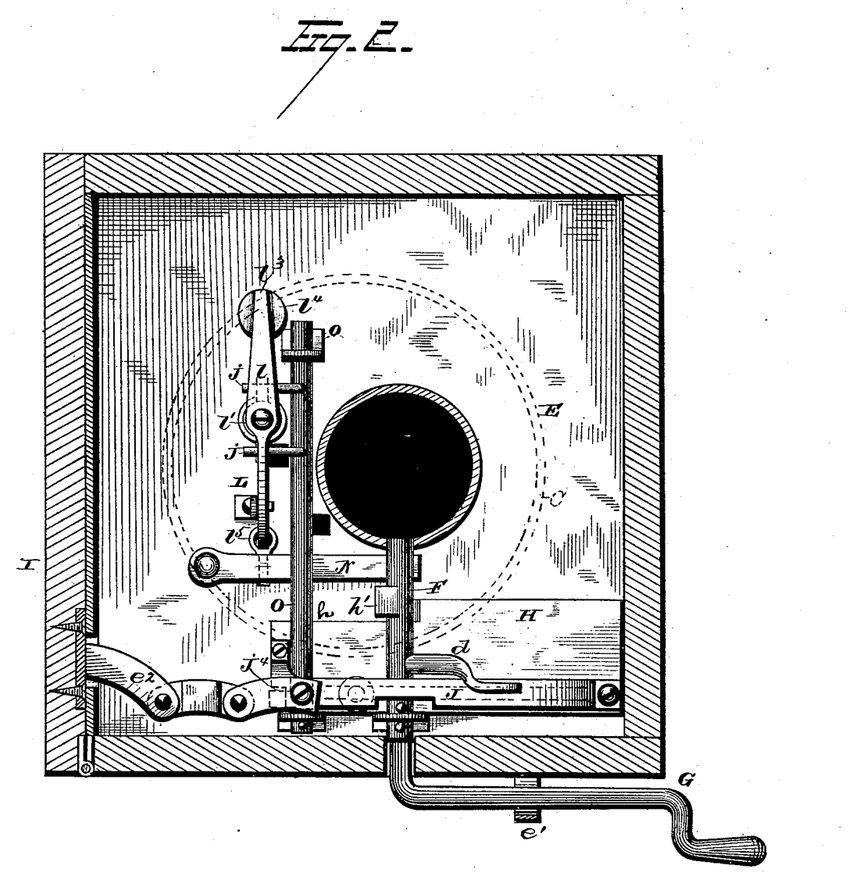
Fig. 2 is a view in horizontal section, showing the mechanism employed in locking the tilting platform.
Figure 3:
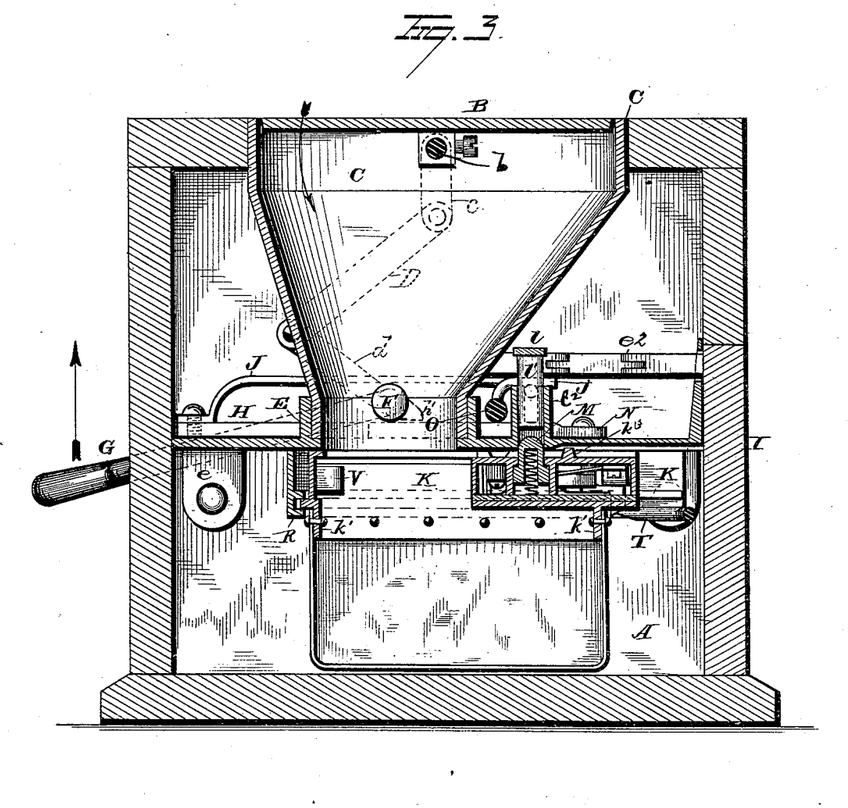
Fig. 3 is a vertical section.
Figure 4:
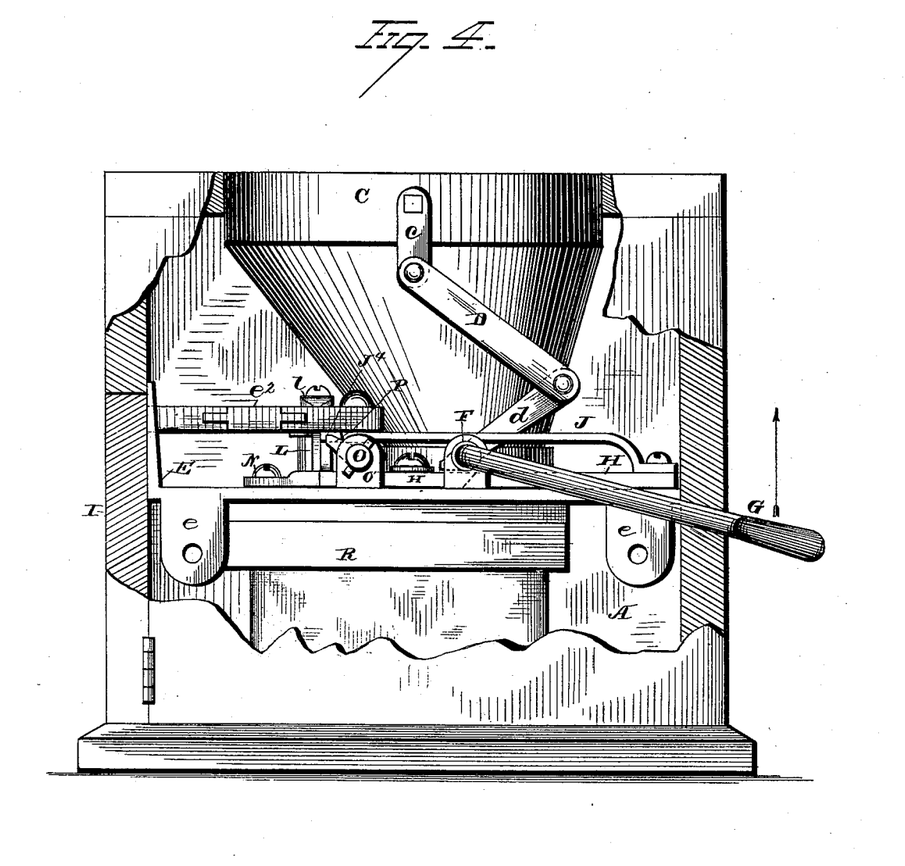
Fig. 4 is a view of the lower portion of the box with one side removed.
Figure 5:
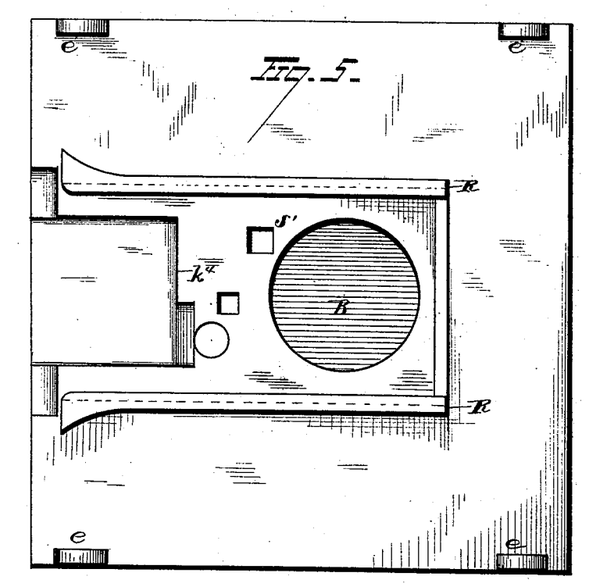
Fig. 5 is a view of the under side of the plate having the slide for the reception of the bag or drawer.
Figure 6:
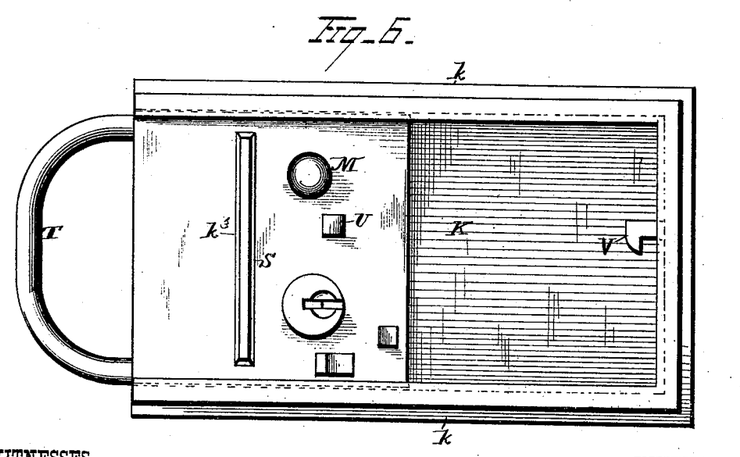
Fig. 6 is a view of the drawer with the mouth-piece open.
Figure 7:
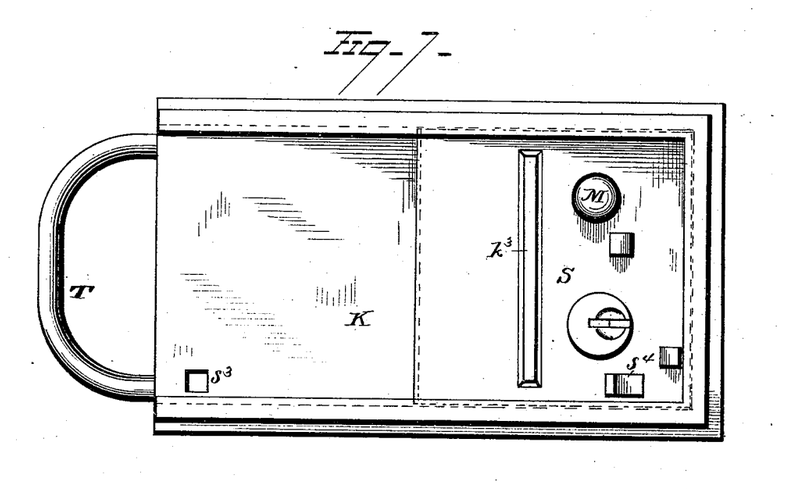
Fig. 7 is a view of the same in a closed position.
Figure 8:
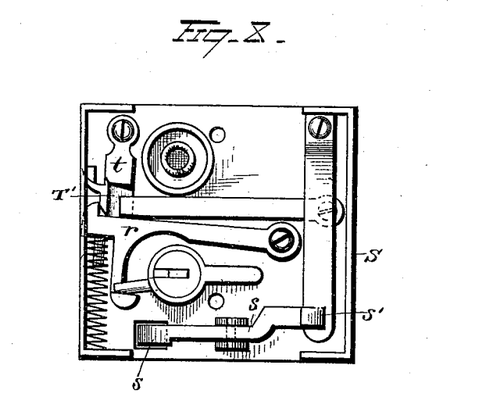
Fig. 8 is a view of the interior of the lock.
Figure 9:
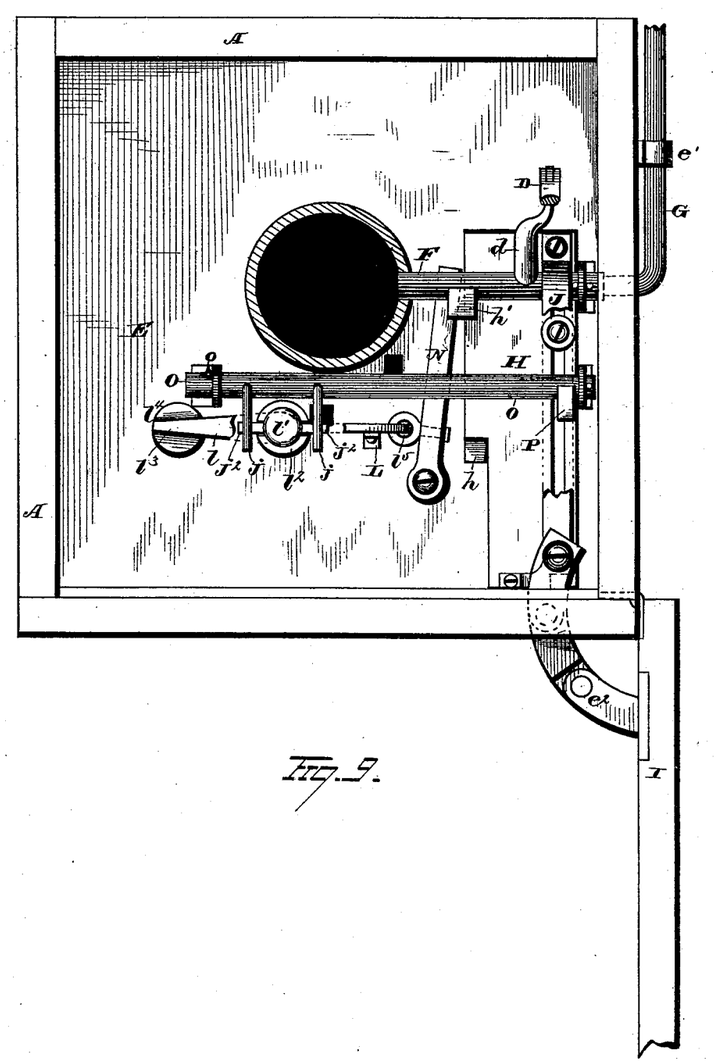
Fig. 9 is a view of the mechanism for locking the platform when the door is open.

The mechanism for automatically locking the tilting platform when the door leading to the interior of the box is opened consists of a sliding plate, H, having a cut-away portion, $h$, which allows a lug, $h'$, on the shaft F to move freely when the door I is closed; but when the latter is opened it automatically closes the said platform, if it should by any chance happen to be in a vertical position instead of horizontal, and prevents its return to a vertical position until the door has been closed. The door I has attached to it, near its hinged end, the jointed connecting-link $e^2$, the opposite end of which is secured to the bridge J, which spans the sliding plate and operates the mechanism for locking the tilting platform when the drawer or bag has been taken out of the box. The sliding plate H is provided with a cut-away portion, $h$, at one side to allow the lug $h'$ on the shaft F to move freely when the door I is closed, and an oblong slot extending nearly throughout its entire length, through which lugs from the top of the plate E project and keep the sliding plate in position. When the door I is closed the tilting platform B can be operated without meeting any difficulties, as the lug $h'$ is then allowed free movement within the cut-away portion of the sliding plate; but when the door is opened the sliding plate H is drawn forward, and the projecting end thereof strikes the lug $h'$ on the rock-shaft F and turns the shaft partly around, and operates the mechanism connected with the platform, and closes and holds the same in its closed or locked position until the door I has been closed, the lug $h'$ in the meantime partly resting on the top of the sliding plate, which prevents any movement of the rock-shaft.

The automatic mechanism for preventing the tilting of the platform when the drawer is withdrawn is situated on the plate E, and is operated by the bridge J on the sliding plate, in conjunction with the mouth-piece of the drawer or bag, the bridge operating principally to keep this latter mechanism from opposing the free working of the platform when the drawer or bag is in position, while the mouth-piece K and the communicating mechanism tend to constantly keep the platform locked.

L is an upright standard, having a vibrating arm or lever, $l$, pivoted at one side of its center thereto, the said lever having a downwardly-projecting arm, $l'$, fitting and working in a sleeve, $l^2$, the said arm projecting through and resting flush with the bottom of plate E, where it engages with the spring-pressed stop M of the mouth-piece of the drawer or bag. The end $l^3$ of the lever is provided with a weight, $l^4$, which constantly tends to depress this end, and consequently elevate the other end, $l^5$, which is bent downwardly and engages with the pivoted lever N. This lever N is pivoted at its front end to the plate E and extends rearwardly, where it is adapted to slide under a portion of the lug $h'$ which projects over the side of the sliding plate H. The tendency of the horizontal lever is to constantly keep the sliding lever under the lug $h'$. This is overcome when the door I is closed by the spring-stop M on the mouth-piece K acting on the under side of the downwardly-projecting arm $l'$, which raises the weighted end of the horizontal lever, and withdraws the pivoted lever N from under the lug $h'$, and allows the latter to turn; but when the bag or drawer has been withdrawn from the box this upward pressure is also withdrawn, which allows the weight to act and throw the lever N under the lug $h'$, where it remains until the bag has again been placed in position and the door I closed.

As before stated, the constant tendency of the above mechanism is to keep the pivoted lever N continuously under the lug $h'$, and the spring-pressed stop M of the mouth-piece K, acting on the horizontal lever, overcomes this tendency and withdraws the pivoted lever from under the lug $h'$; but when the drawer is in position and the door is thrown open the lever N is thrown under a part of the lug $h'$ and assists the sliding plate in preventing its turning. This is accomplished by means of the shaft O, journaled in the bearings $o$ $o'$ on the plate E, and provided with a cam, P, at one end, which engages with the bridge J, and two fingers, $j$ $j$, near its other end, which fit over projections $j^2$ on the sides of the downwardly-projecting arm $l'$ of the horizontal lever $l$. The front edge of the bridge J is cut away at one corner, as shown at $j^4$, which allows the cam P to rise when the door is closed by the pressure of the spring-stop M on the downwardly-projecting arm $l$, which acts on the shaft and causes same to rise. When the door is thrown open this pressure is overcome by the cam P being forced under the bridge, and transmits the motion to the shaft O, which acts on the downwardly-projecting arm $l$ by the projection $j^2$, and depresses the weighted end of the beam and throws the pivoted lever under the lug $h'$. Thus it will be seen that when the spring-pressure from the mouth-piece of the bag is taken from the lever $l$ the weight on the end of the beam causes that end to descend and elevates the other, which throws the pivoted lever under the lug $h'$, where it remains until the mouth-piece has again been placed in position.

K is the mouth-piece of the fare drawer or bag. It consists of a frame having side flanges, $k$, which slide in the guide R, to hold the drawer or bag up into position, and a depending flange, $k'$, extending all around on the under side, onto which the drawer or bag is secured. This frame is also provided with a slide on top, in which the lock S has movement. This lock is about one-half the length of the frame, and is adapted to completely cover the opening in the mouth-piece when the same is withdrawn from the box, and when placed in position to slide back and uncover the opening and allow a free passage for the fares to the drawer. This lock has a ridge, $k^3$, extending across its upper surface, which abuts against a corresponding projection, $k^4$, on the under side of the plate, the latter preventing the lock from proceeding farther into the interior, while the frame is allowed to continue until the lock strikes the front end of said frame, which indicates that the parts are in position. Just at this movement the heads of the double latch $s$, one head projecting above to engage with the plate E and one below to engage with the frame, are automatically allowed to spring into their respective openings, which retains the lock in position in the frame. When the handle T of the frame is grasped to withdraw the drawer from the box the inclined end of the top head of the latch *s* engages with the rear side of opening *s'* and depresses same slightly, which causes the lower head, $s^2$, which is smaller than the upper one, $s^4$, to rise up out of the slot $s^3$, and consequently allows the frame to be withdrawn while the lock is still held stationary by the upper head, $s^4$, and the spring-bolt U, which is drawn in as soon as the lock engages with the latch V at the rear end of the frame. This latch is hook-shaped, with an inclined end, which bears directly against the spring-pressed catch *r* and moves it to one side until the latch V has passed in, when the spring-pressed catch *r* springs back and holds it firmly in position. At the same time the latch is moving the spring-pressed catch, with its inclined side, the end of said latch is bearing on the plate, which is pivoted by its arm *t*. The back of this plate T' is provided with an inclined side, on which the spring carrying the bolt bears, which, when the lock has engaged with the latch and is secured to same, withdraws the bolt, which allows the frame carrying the drawer to be withdrawn without any further resistance.

From the foregoing it will be seen that any attempt on the part of employés to possess themselves of the contents of the box will be foiled and all collusions between them prevented, as it is impossible to withdraw the drawer or bag from the box without automatically locking the tilting platform, and it is also impossible to tilt any money remaining on the tilting platform until the drawer has been replaced; also, the possibility of opening the door, which is secured by an ordinary padlock, withdrawing the bag, and again closing the door without putting another bag in place of the one withdrawn, tilting the platform, and allowing the money purposely left on the tilting platform to be dropped, is avoided, for, as before stated, it is impossible to turn the tilting platform until the bag has been placed in position.

The several parts of my mechanism may be made of sheet metal or cast-iron made strong and durable.

While I have shown one form of lock simply to illustrate the principle of my invention, I would have it understood that I do not limit myself to such lock, but consider myself at liberty to make such changes in the lock, and also in the other parts, as come within the spirit and scope of my invention.

Having fully described my invention, what I claim as new, and desire to secure by Letters Patent, is—

1. In a fare-box, the combination, with the tilting platform and the door to the fare drawer or bag compartment, of connecting mechanism, substantially as described, for locking the tilting platform in its closed position when the door is opened, substantially as set forth.

2. In a fare-box, the combination, with a tilting platform and the door to the compartment for the fare drawer or bag, of a rock-shaft for opening and closing the tilting platform, and mechanism, substantially as described, for preventing rotary movement of the rock-shaft when the door of the compartment is open, substantially as set forth.

3. In a fare-box, the combination, with the tilting platform and a rock-shaft connected therewith for opening and closing the same, of a door having a sliding plate connected therewith, said plate being provided with an opening which registers with a lug on the rock-shaft when the door is closed, and allows the tilting platform to be operated, while the plate, being moved by opening the door, serves to lock the tilting platform in its closed position, substantially as set forth.

4. The combination, with the tilting platform of a fare-box, of the mouth-piece of a drawer or bag adapted to be supported in guideways located beneath the tilting platform, and mechanism, substantially as described, for automatically locking the tilting platform in its closed position when the fare drawer or bag is withdrawn, substantially as set forth.

5. The combination, with the tilting platform of a fare-box, of the mouth-piece of a drawer or bag adapted to be supported in guideways located beneath the tilting platform, and mechanism, substantially as described, for automatically locking the tilting platform in its closed position when the fare-drawer is withdrawn, and mechanism for automatically unlocking the tilting platform when the drawer or bag is returned and the door is closed, substantially as set forth.

6. The combination, with a box provided with a tilting platform and fare drawer or bag provided with a mouth-piece adapted to fit in guides attached to the box, of mechanism, substantially as described, for retaining the tilting platform in its locked condition when the door of the box is open, and when the fare bag or drawer is withdrawn, substantially as set forth.

7. In a fare-box, the combination, with a tilting platform, link, and rock-shaft, the latter having a lug formed thereon, of a sliding plate adapted to engage with said lug, substantially as set forth.

8. In a fare-box, the combination, with a tilting platform, link, and rock-shaft, the latter having a lug formed thereon, of a sliding plate connected by jointed links to the door and adapted to engage with the lug when the door is opened, substantially as set forth.

9. In a fare-box, the combination, with a tilting platform connected to a rock-shaft, the said rock shaft having a lug formed thereon, of a pivoted lever adapted to be thrown under said lug when the fare drawer or bag is withdrawn, substantially as set forth.

10. In a fare-box, the combination, with a tilting platform connected to a rock-shaft by intervening mechanism, substantially as described, the said rock-shaft having a lug formed thereon, of a vibrating lever, having a weight at one end, a pivotal lever, and means, substantially as described, for engaging with the pivoted lever at the other to throw the said pivoted lever under the said lug, substantially as set forth.

11. In a fare-box, the combination, with a tilting platform connected to a rock-shaft by intervening mechanism, substantially as described, of a vibrating lever having a weight secured thereon, a downwardly-projecting arm to engage with a spring-stop on the mouthpiece, a pivoted lever, and means, substantially as described, for engaging with the pivoted lever, substantially as set forth.

12. In a fare-box, the combination, with a tilting platform connected to a rock-shaft by intervening mechanism, substantially as described, a sliding plate having a bridge secured thereto, and a vibrating lever having a weight secured thereon, a depending arm to engage with a stop on the lock, and means, substantially as described, for engaging with a pivoted lever, of a shaft having a cam adapted to engage with said bridge, and fingers to engage said depending arm, substantially as set forth.

In testimony that I claim the foregoing I have hereunto set my hand this 14th day of April, 1881.

GEORGE D. PAUL.

Witnesses:
 CHAS. T. LAWSON,
 WM. F. LETT.